United States Patent
Enguent

(10) Patent No.: US 7,265,610 B2
(45) Date of Patent: Sep. 4, 2007

(54) ERROR DETECTION IN A SIGNAL IN AMPLITUDE MODULATION

(75) Inventor: Jean-Pierre Enguent, Saint Savournin (FR)

(73) Assignee: STMicroelectronics S.A., Montrouge (FR)

( * ) Notice: Subject to any disclaimer, the term of this patent is extended or adjusted under 35 U.S.C. 154(b) by 41 days.

(21) Appl. No.: 11/300,537

(22) Filed: Dec. 14, 2005

(65) Prior Publication Data

US 2006/0125553 A1   Jun. 15, 2006

(30) Foreign Application Priority Data

Dec. 14, 2004   (FR) .................................. 04 52954

(51) Int. Cl.
*H03D 1/00* (2006.01)
(52) U.S. Cl. .................. 329/347; 329/349; 455/303; 340/10.4

(58) Field of Classification Search ................ 329/347, 329/349; 340/10.4; 455/303
See application file for complete search history.

(56) References Cited

U.S. PATENT DOCUMENTS

| 5,874,725 | A | 2/1999 | Yamaguchi et al. |
| 6,031,419 | A | 2/2000 | Roberts et al. |
| 6,636,146 | B1 * | 10/2003 | Wehoski .................... 340/10.4 |
| 6,654,466 | B1 | 11/2003 | Ikefuji et al. |
| 2003/0085278 | A1 | 5/2003 | Schoenbauer |

OTHER PUBLICATIONS

French Search Report from French Patent Application 04/52954, filed Dec. 14, 2004.

* cited by examiner

*Primary Examiner*—Arnold Kinkead
(74) *Attorney, Agent, or Firm*—Lisa K. Jorgenson; James H. Morris; Wolf, Greenfield & Sacks, P.C.

(57) ABSTRACT

A method and a circuit for detecting a modulation factor in a signal received in amplitude modulation, including comparing the received signal with two first values, comparing the received signal with two second values ranging between the first two values, and considering the presence of an insufficient modulation depth if the received signal ranges between at least two of said values.

16 Claims, 2 Drawing Sheets

ERROR DETECTION IN A SIGNAL IN AMPLITUDE MODULATION

BACKGROUND OF THE INVENTION

1. Field of the Invention

The present invention generally relates to amplitude modulation radiofrequency transmissions and, more specifically, transmissions performed with a modulation factor smaller than one.

An example of application of the present invention relates to electromagnetic transponder systems in which a high-frequency carrier is modulated at least in amplitude by a terminal for transmission to an electromagnetic transponder, for example, carried by a smart card, in the field of the terminal.

2. Discussion of the Related Art

Electromagnetic transponder systems are based on the cooperation between an oscillating circuit on the read/write terminal side and a resonant circuit on the electromagnetic transponder side (generally, a portable element), to exchange information by using a high-frequency field radiated by the oscillating circuit of the terminal. Most often, the high-frequency carrier is also used as a remote-supply carrier providing the transponder supply power.

Such systems are for example described in U.S. Pat. Nos. 6,031,319 and 6,703,921, which are incorporated herein by reference.

An example of application of the present invention relates to transponder systems based on standards ISO 14443 and 15693 according to which the remote-supply carrier radiated by the terminal is 13.56 MHz, while a back-modulation sub-carrier may be used by the transponders to transmit information to the terminal with a 847.5-kHz frequency. This sub-carrier is however not always present, according to applications (of these standards or not). In the terminal-to-transponder direction, the carrier is modulated in amplitude with a modulation factor generally on the order of 10% with a flow rate on the order of 106 kbits/second. The modulation factor is defined as being the amplitude difference between the transmission of a state 1 and the transmission of a state 0, divided by the sum of these amplitudes.

In fact, the standards set a range of acceptable modulation factors that the transponders are supposed to be able to interpret, and that the terminals are supposed to comply with. This range is, in the case of the above-mentioned standards, between 8 and 14%.

FIG. 1 very schematically shows, in the form of blocks, an example of an electromagnetic transponder system to which the present invention applies. A transponder 1 (TR) is intended to be placed in the electromagnetic field of a terminal 2 (TERM) having an inductive element L2 of an oscillating circuit emitting a high-frequency radiation detected by an antenna L1 of transponder 1.

FIG. 2 very schematically shows, partly in the form of blocks, an example of a conventional architecture of an electromagnetic transponder 1, intended to communicate with a read/write terminal (not shown in FIG. 2). The transponder comprises an oscillating circuit 10, formed of an inductive element L1 forming an antenna, in parallel with a capacitor C1 at the A.C. input terminals of a rectifying bridge 11. The rectified output terminals of bridge 11 are connected by a storage capacitor Cs.

The signal detected when transponder 1 is in the field of a terminal is used, on the one hand, for extracting a supply voltage Vdd from the transponder circuits, generally by means of a regulator 12 (REG) and, on the other hand, for decoding the possible data transmitted by the terminal. For this purpose, the transponder includes an amplitude demodulation circuit including, for example a filter formed of a resistor R5 connecting the output of bridge 11 to a first electrode of a capacitor C3 having its other electrode connected to ground (second output terminal of bridge 1); a capacitor C4 conveying the A.C. output component of the previous filter; a resistor R6 connecting the electrode of capacitor C4 opposite to the filter to a first electrode of a capacitor C5 having its other electrode connected to ground; two comparators 13 and 14 of the signal sampled from the second electrode of capacitor C4 with two thresholds Vdd/2−ref1 and Vdd/2+ref1; and an RS-type flip-flop 15, having its set and reset inputs S and R receiving the respective outputs of comparators 13 and 14 and having its output D providing the detected (demodulated) state to a digital interpretation circuit 16 (for example, an arithmetical and logic unit UART).

Thresholds Vdd/2−ref1 and Vdd/2+ref1 are set by a dividing bridge formed of four resistive components R1, R2, R3, and R4 in series between two terminals of application of voltage Vdd, resistors R1 and R4 being of same value and resistors R2 and R3 being of same value so that the bridge sets, via resistor R6, a voltage proportional to half Vdd/2 of supply voltage Vdd.

The function of resistor element R6 is to transfer, onto the sampling node of the signal to be interpreted, value Vdd/2 to center the variations due to the state switching edges of the envelope of the amplitude-modulated signal.

A demodulator such as shown in FIG. 2 is described, for example, in U.S. Pat. No. 6,031,319.

To simplify the representation of FIG. 2, account has only been taken of the receive portion of the transponder. In particular, the back-modulation elements enabling modifying the load formed by the transponder in the electromagnetic field of a terminal for a transmission in the terminal-to-transponder direction have not been shown.

FIGS. 3A, 3B, 3C, and 3D illustrate the operation of the demodulator shown in FIG. 2. FIG. 3A shows an example of the shape of a signal transmitted by a terminal to transponder 1. FIG. 3B illustrates the shape of the signal received at the output of rectifying bridge 11 (upstream of filter 13). FIG. 3C illustrates the shape of the signal applied on the comparison inputs of comparators 13 and 14 (for example, the non-inverting input of comparator 13 and the inverting input of comparator 14) and the comparison thresholds set by resistors R1, R2, R3, and R4 (for example, Vdd/2+ref1 above half of voltage Vdd, and Vdd/2−ref1 under). FIG. 3D illustrates the result provided by the D output of flip-flop 15.

As illustrated in FIG. 3A, the carrier (for example, at 13.56 MHz) is modulated in amplitude with a modulation factor according to the state of the transmitted bit. The rate of the amplitude modulation is smaller than the carrier frequency. It can arbitrarily be considered that the high state (level a) corresponds to a state 1, while the low state (level b) corresponds to a state 0. The modulation factor (a−b/a+b) has been exaggerated in FIG. 3A. It is in practice smaller than 20% in ISO standard 14443, type B.

As illustrated in FIG. 3B, once rectified and filtered by elements R5 and C3, the signal is, in principle above or under its average value according to state 1 or 0 of the transmitted bit.

As illustrated in the left-hand portion of FIG. 3C, capacitor C4 filters the D.C. component so that the signal applied on the comparison inputs of comparators 13 and 14 only comprises, around value Vdd/2, edges at state switchings.

As illustrated in FIG. 3D, comparators 13 and 14 detect when the signal comes out of the window defined by thresholds Vdd/2−ref1 and Vdd/2+ref1, and flip-flop 15 provides a state 0 or 1 according to the direction of the detected edge.

However, if the terminal is not able to maintain a sufficient modulation factor (in practice, of at least some ten percent), interpretation errors under the effect of noise are possible, the intervals between the received levels and the thresholds becoming too small. In the extreme case, the thresholds may surround the received signal in both states 0 and 1.

This phenomenon is illustrated in the right-hand portions of FIGS. 3A to 3D which show the case of a signal between amplitudes a' and b' defining a smaller modulation factor than in the left-hand portion. As illustrated in FIGS. 3B and 3C, possible noises are likely to come out of the range defined by thresholds Vdd/2−ref1 and Vdd/2+ref1 whatever the state of the transmitted bit, generating erroneous detections (FIG. 3D).

The above problem is more and more present due to the multiplication of the types of terminals and of the types of transponders which are likely to cooperate with one another. Indeed, according to the manufacturing and the architecture of the terminal and/or of the transponder, their respective operation characteristics are likely to influence the other transmission element (transponder or terminal) in a different manner. Further, the environment in which the terminal and the transponder are present may also influence the electromagnetic field and the modulation factor effectively transmitted by the terminal.

In practice, the terminals are set in a characterization phase so that their modulation factor ranges, in the above-mentioned standards, between 8 and 14%. However, in real operation, this rate is likely to vary for the above-discussed reasons and to become undetectable by a transponder.

The fact that a transponder may not succeed in interpreting the data received by a terminal is a first disadvantage.

A second disadvantage is that the terminal receiving no response from the transponder knows that it has not been understood, but does not know why. In particular, other malfunctions may cause a poor detection of the signal by the transponder, without this being linked to the modulation factor.

It would be desirable for the terminal to be able to modify in real time the modulation factor of the signal that it transmits so that said signal can be properly detected by a transponder.

The setting of the modulation factor is not a practical difficulty since terminals are generally equipped with microprocessors to set the transceiver circuits and this setting capacitance most often already exists for the terminal characterization phase. However, terminals are currently unable to set this modulation factor in real time, since they have no coherent information about the reason which causes this absence of a proper reception by a transponder.

The notion of modulation factor is used to characterize the amplitude difference between amplitude-modulation transmitted states 0 and 1. However, other parameters such as, for example, the modulation index, which corresponds to the ratio (a/b) between the two amplitudes, are sometimes used. Referring to these parameters would amount to the same, and would only be other ways of discussing the problem.

SUMMARY OF THE INVENTION

The present invention aims at overcoming all or part of the disadvantages of known systems of amplitude-modulation transmission on a variable load.

The present invention especially aims at detecting an insufficiency in the modulation factor.

The present invention also aims at providing a solution in which this detection causes no modification of the transmit terminal and is performed on the receiver side.

The present invention also aims at informing the transmit terminal of the type of disturbance generating a misinterpretation of the data by the receiver.

The present invention also aims at providing a solution which is particularly well adapted to electromagnetic transponder systems.

To achieve all or part of these objects, as well as others, the present invention provides a method for detecting a modulation factor in a signal received in amplitude modulation, comprising:

comparing the received signal with two first values;

comparing the received signal with two second values ranging between the two first values; and considering the presence of an insufficient modulation depth if the received signal ranges between at least two of said values.

According to an embodiment of the present invention, said values are adapted with respect to the average level of the received signal.

According to an embodiment of the present invention, said values are adapted to the supply voltage of the demodulator.

According to an embodiment of the present invention, information about the possible presence of an insufficient modulation factor is transmitted to the signal transmitter.

According to an embodiment of the present invention, the receiver is an electromagnetic transponder.

The present invention also provides a method for detecting errors in a signal received in amplitude modulation, comprising:

detecting a possible insufficiency of the modulation factor of the transmitted signal; and detecting a possible error due to noise by sampling the demodulated signal at a frequency greater than the modulation frequency, to detect possible parasitic state switchings.

According to an embodiment of the present invention, information about the possible presence of an error due to the noise is transmitted to the signal transmitter, to cause a decrease in the transmission passband.

According to an embodiment of the present invention, a possible frame error is detected by checking of predetermined data at each start of frame.

According to an embodiment of the present invention, information about the presence of a frame error is transmitted to the signal transmitter.

The present invention also provides an amplitude demodulator, comprising:

a first element for filtering a signal received in amplitude modulation to provide a signal to be interpreted;

a second filtering element having a time constant smaller than that of the first filtering element to determine an average value of the received signal;

two first elements of comparison of the amplitude of the signal to be interpreted with respect to two values surrounding said average value;

at least two second elements for comparing the amplitude of the signal to be interpreted with respect to two second values surrounding the average value and ranging between the first two values; and a circuit for interpreting the results of the comparison elements indicating an insufficient modulation factor if the received signal ranges between at least two of said values.

The present invention also provides an amplitude demodulator comprising:

an element for filtering a signal received in amplitude modulation;

a capacitive element for filtering a first D.C. component provided by the filtering element;

an element for adding a second D.C. component corresponding to half the supply voltage of the demodulator to the signal resulting from the capacitive element;

two first elements of comparison of the amplitude of the signal to be interpreted with respect to two values surrounding half of said supply voltage;

at least two second elements for comparing the amplitude of the signal to be interpreted with respect to two second values surrounding half of said supply voltage and ranging between the two first values; and a circuit for interpreting the results of the comparison elements indicating an insufficient modulation factor if the received signal ranges between at least two of said values.

According to an embodiment of the present invention, the outputs of the comparison elements are read by flip-flops.

According to an embodiment of the present invention, the circuit for interpreting the demodulated data checks for the presence of a predetermined message at each start of a transmitted frame.

According to an embodiment of the present invention, the circuit for interpreting the demodulated data checks for the presence of fast state switchings as compared with the time constant of the first filtering element to determine a possible presence of noise.

The foregoing and other objects, features, and advantages of the present invention will be discussed in detail in the following non-limiting description of specific embodiments in connection with the accompanying drawings.

DETAILED DESCRIPTION

Figure 1:
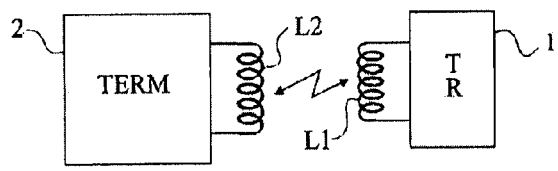
FIG. 1, previously described, very schematically shows in the form of blocks an example of an electromagnetic transponder system of the type to which the present invention preferentially applies.

The same elements have been designated with the same reference numerals in the different drawings. For clarity, only those elements which are necessary to the understanding of the present invention have been shown and will be described hereafter. In particular, the respective structures of the digital systems (microprocessor or wired logic) of interpretation of the transmitted data have not been shown, the present invention being compatible with conventional systems.

The present invention will be described hereafter in relation with an example of application to electromagnetic transponders. It should however be noted that it more generally applies to any amplitude modulation transmission system in which a modification in the modulation factor is likely to generate interpretation errors. For example, it may be other radiofrequency transmission systems, or even wire transmission systems (modem).

Figure 4:
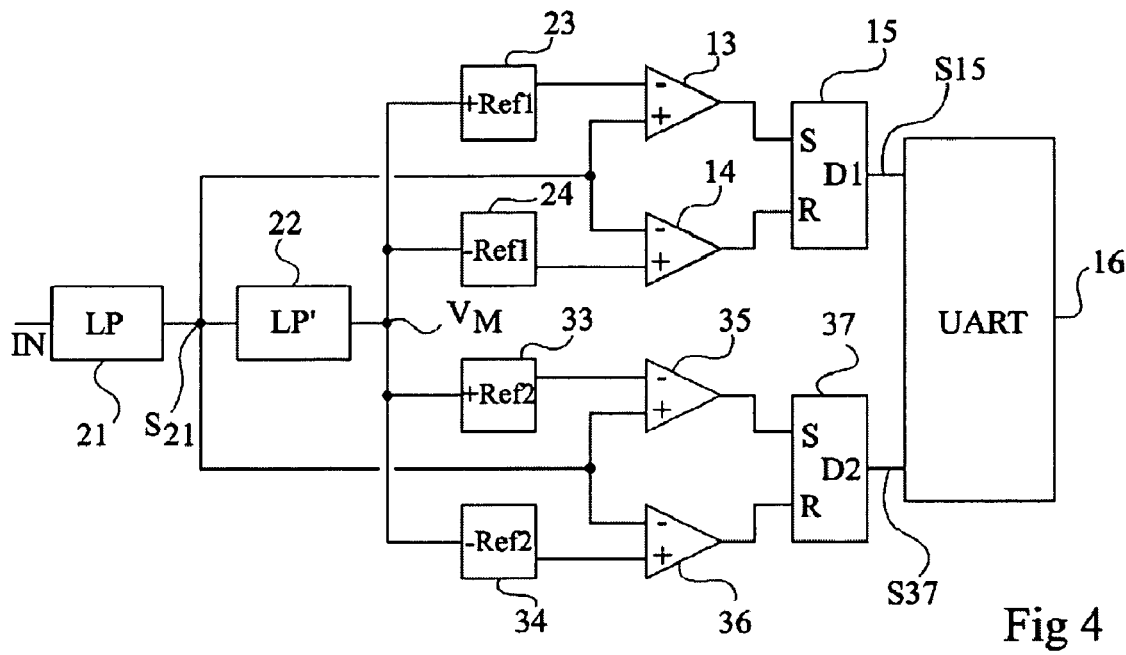
FIG. 4 very schematically shows in the form of blocks an embodiment of a terminal of an electromagnetic transponder system according to the present invention.

FIG. 4 schematically shows in the form of blocks an embodiment of a demodulator according to the present invention.

This demodulator is intended to receive an amplitude-modulated signal IN coming, for example, from the output of a rectifying bridge (11, FIG. 2) of an oscillating circuit of an electromagnetic transponder. Signal IN is applied to a first low-pass filter 21 (LP), the time constant of which is a function of the amplitude modulation rate of signal IN (for example, 106 kbits/second). Output S21 of filter 21 is used on the one hand to interpret the received signal and on the other hand to generate, by means of a second low-pass filter 22 (LP'), an average value $V_M$ of this signal.

Two elements 23 and 24 are used to generate, for example, based on supply voltage Vdd of the transponder, two comparison thresholds $V_M$+ref1 and $V_M$−ref1 from the average value provided by filter 22. For example, value ref1 is selected in the same way as for conventional demodulators.

According to this embodiment of the present invention, two other thresholds $V_M$+ref2 and $V_M$−ref2 are generated by elements 33 and 34 which receive average value $V_M$. The thresholds provided by elements 33 and 34 are provided to range between thresholds $V_M$+ref1 and $V_M$−ref1.

Elements 23, 24, 33, and 34 are, for example, formed of one or several resistive dividing bridges of value $V_M$ having intermediary points providing the different thresholds.

The demodulator of FIG. 4 comprises four elements 13, 14, 35, and 36 for comparing the received signal (output S21 of filter 21) with the four thresholds provided by elements 23, 24, 33, and 34. In the shown example, the two comparators 13 and 35 receive, on their respective inverting inputs, signals $V_M$+ref1 and $V_M$+ref2 and, on their respective non-inverting inputs, output signal S21 of filter 21. Comparators 14 and 36 receive, on their respective inverting inputs, the output signal of filter 21 and, on their respective non-inverting inputs, thresholds $V_M$−ref1 and $V_M$−ref2. The outputs of comparators 13 and 14 are sent onto the respective set and reset inputs S and R of an RS flip-flop 15 or any other equivalent element having its output D1 providing the signal state with respect to thresholds $V_M$−ref1 and $V_M$+ref1. The respective outputs of comparators 35 and 36 are sent onto set and reset inputs S and R of a second flip-flop 37 or the like having its output D2 providing the signal state with respect to thresholds $V_M$−ref2 and $V_M$+ref2.

Respective outputs S15 and S37 of flip-flops 15 and 37 are interpreted by a circuit 16 forming an arithmetical and logic unit (UART) or any other digital element for interpreting the received data.

Figure 2:
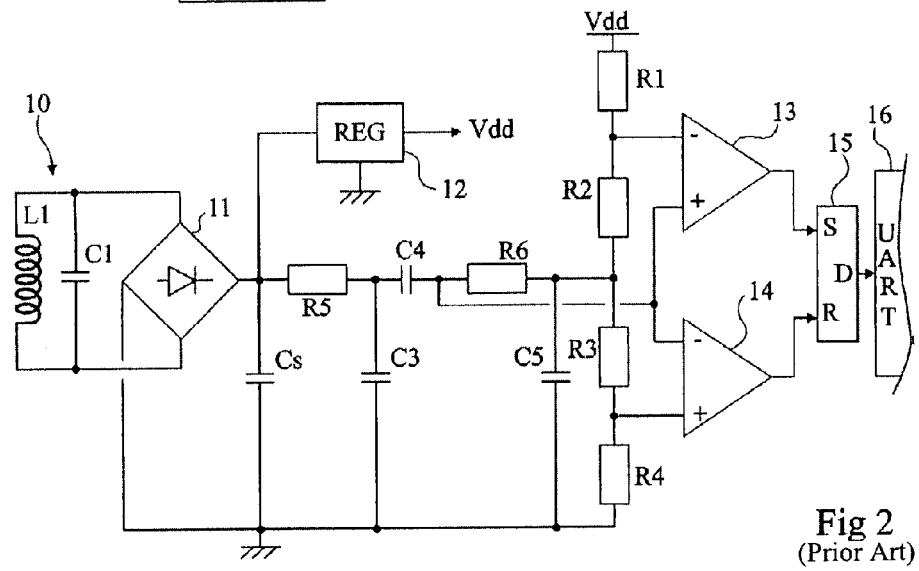
FIG. 2, previously described, partially shows, very schematically and in the form of blocks, an example of a conventional electromagnetic transponder architecture.
Figure 3A:
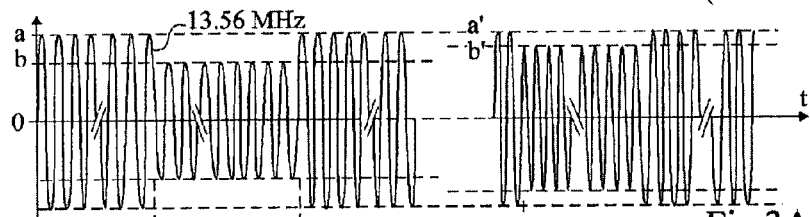
FIGS. 3A, 3B, 3C, and 3D, previously described, illustrate the operation of the demodulator of the transponder of FIG. 2.
Figure 3B:
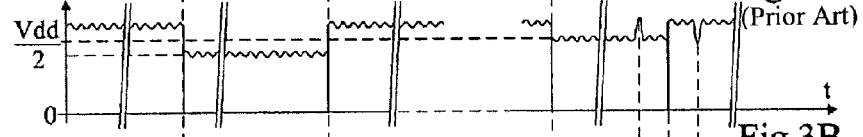
Figure 3C:
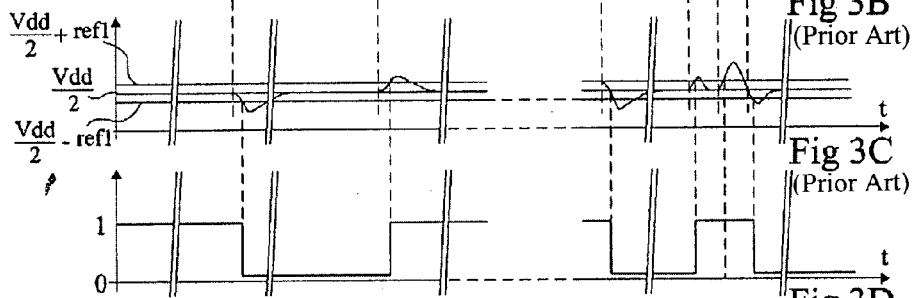
Figure 3D:
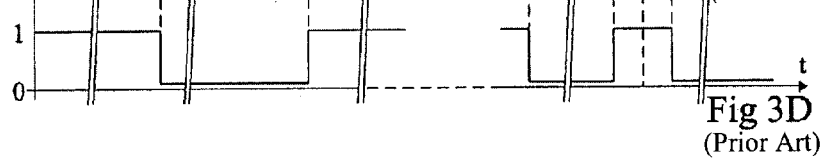

According to another embodiment, not shown, the demodulator is based on the structure of the conventional demodulator shown in FIG. 2 to which, according to the present invention, two comparators and two generations of thresholds Vdd/2−ref2 and Vdd/2+ref2 ranging between thresholds Vdd/2−ref1 and Vdd/2+ref1 are added. Functionally, the difference with respect to the embodiment of FIG. 4 is that the thresholds are based on the supply voltage (which ideally corresponds to the average value) and not on the average value of the received signal.

Figure 5:
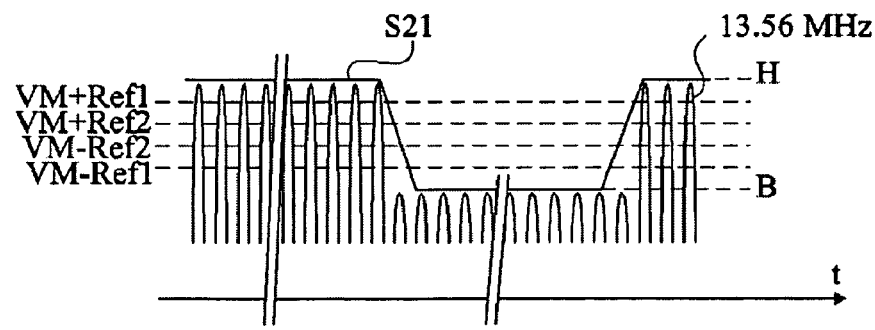
FIG. 5 illustrates the operation of the demodulator of FIG. 4.
Figure 6:
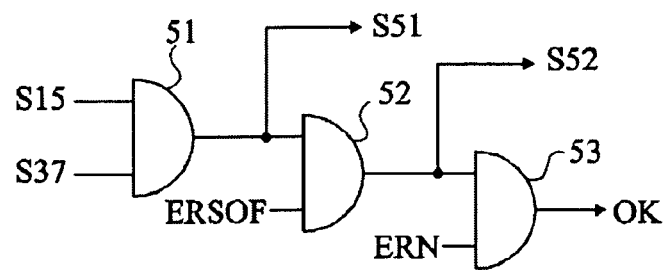
FIG. 6 shows an embodiment of an interpretation element of the demodulator of FIG. 4.

FIG. 5 illustrates, in a simplified timing diagram, the operation of the demodulator of FIG. 4. Output signal S21 of filter 21 corresponds to the envelope of the carrier (for example, at 13.56 MHz). For simplification, no account has been taken of possible noise around this envelope. However, and as will be seen hereafter, the present invention also enables avoiding possible false detections due to such noise. Values ref1 and ref2 are selected according to the modulation factors acceptable for the system. Thresholds $V_M$−ref1, $V_M$+ref1, $V_M$−ref2, and $V_M$+ref2 are adapted to average value $V_M$ so that they range between the two respective high and low states H and B of the signal indicating, for example, the transmitted states 1 or 0.

The results provided by flip-flops 15 and 37 are interpreted to determine whether the modulation factor of the signal transmitted by the terminal is or not sufficient. Functionally, a modulation factor is considered as sufficient if the states of the two bits S15 and S37 are coherent with each other, that is, if they are either both in the low state, or both in the high state. In the opposite case (for example, if the signal comes out of the range defined by thresholds $V_M$−ref2 and $V_M$+ref2 while remaining within the range defined by thresholds $V_M$−ref1 and $V_M$+ref1), this means an insufficient modulation depth. It is then provided to transmit this information to the terminal (2, FIG. 1) so that it adapts the modulation factor of its transmissions. Different methods for transmitting this information to the terminal may be envisaged, as will be seen hereafter.

According to a preferred embodiment of the present invention, a second test is executed to determine the presence of disturbing noise. Indeed, in a conventional demodulator, the presence of noise may also generate detection errors. In the presence of such errors, the terminal may, for example, reduce the signal bandwidth (that is, the flow rate). Here again, however, the terminal must know the cause of the detection error to be able to take the appropriate measures.

According to a preferred embodiment of the present invention, possible fast state switchings of the demodulated signal are detected after demodulation. Such a detection is performed by unit 16, for example, by an adapted programming. This detection amounts to sampling the received signal at a frequency greater than the bandwidth to detect fast switchings likely to result from possible noise. The detection is performed, for example, at each start of frame detected by unit 16, which provides a second error indicator (for example, a bit ERN) linked to the noise.

Preferably, a third frame coherence test is performed by using, for example, start of frame bits SOF transmitted from the terminal to the transponder. For example, a number of bits is set in a stable state (for example, state 0) transmitted at each start of frame. This number of bits may be, for example, 10 or 11 in the case of standard ISO 14443, type B. If, in receive mode, the transponder effectively receives the provided number of bits at the start of frame, this means that the frame starts properly. In this opposite case, and provided that the modulation factor is considered as sufficient by the previous checking against thresholds $V_M$−ref1, $V_M$+ref1, $V_M$−ref2, and $V_M$+ref2 and that no disturbance due to noise has been detected by the second test (if provided), it is considered that there is a frame error. Accordingly, if the signal provided by filter 21 is smaller than the two thresholds $V_M$−ref1 and $V_M$−ref2 representing a low level, if unit 16 has not detected too high a noise, but unit 16 does not detect, for example, 10 consecutive bits at state 0, it is provided to inform the terminal (for example, by the state of a bit ERSOF) that the transmitted frame is erroneous so that it can, for example, retransmit it.

The three detected states (modulation factor, noise, and frame error) are, according to a preferred embodiment of the present invention, exploited together to indicate to the terminal a possible modification in its transmission to improve the transmission.

FIG. 7 very schematically shows with a diagram based on logic gates an example of a combination of the different states by implementation of the present invention.

A first AND-type logic gate 51 combines the respective outputs S15 and S37 of flip-flops 15 and 37 to detect the presence of a simultaneous passing beyond thresholds ref1 and ref2 in a same direction. The output of gate 51 provides a bit S51 indicative of a sufficient (state 1) or not (state 0) modulation factor in transmission. This output is received by a first input of a second AND-TYPE logic gate 52 having its other input receiving bit ERSOF indicative of the absence of a correct start of frame reception (some ten bits in the same state). It is assumed that a bit ERSOF at state 1 means a correct reception. Output S52 of gate 52 is sent to the input of a third AND-type logic gate 53 having its second input receiving bit ERN, indicative of an error due to noise, detected by unit 16.

If the output of gate 53 is in the high state, this means a sufficiently good transmission requiring no adaptation from the terminal. In the opposite case:

if the output of gate 52 is at state 1, this means an error due to noise and the transponder will ask the terminal to reduce its bandwidth;

if the output of gate 52 is at state 0 but the output of gate 51 is at state 1, this means a frame error and the transponder will indicate this state to the terminal;

if output S51 is at state zero, this means that the terminal should be asked to increase its modulation factor.

The information transmission from the transponder to the terminal may be performed in several manners.

According to a first example, the transponder controls its back modulation so as not to respect the format of a frame expected by the terminal. For example, it modifies the beginning of its response frame (bits of word SOF of its frame) to warn the terminal of a problem. By detecting a specific start of frame (for example, eight successive phase switchings in word SOF), the reader knows that it must wait for specific information relative to a detected error.

According to a first example, the next frame (the eight data bits between a starting bit and a stop bit) is then used to transmit the information.

According to a second example, the number of phase switchings of the start of frame is modulated according to the information to be transmitted. Three different types of information may be transmitted in case of a problem. For example, eight successive phase switchings are provided to require a modulation depth greater than the terminal, sixteen successive phase switchings are provided to require a decrease in the bandwidth, or twenty-four successive phase switching are provided to indicate a frame error.

The bandwidth change in the terminal may be performed either digitally directly by the microprocessor contained in the terminal, or by switching a resistor in series with the inductance of the oscillating circuit.

According to another embodiment of the present invention, the information relative to a possible detected error uses bits traditionally not used in response frames from a transponder to a terminal. This embodiment is more specifically intended for the application of ISO standard 14443 and for the frames provided by said standard.

Of course, the present invention is likely to have various alterations, modifications, and improvements which will readily occur to those skilled in the art. In particular, the practical implementation of the present invention based on the functional indications given hereabove is within the abilities of those skilled in the art by using conventional tools. Further, the transposition of the present invention to another application than electromagnetic transponders to solve modulation factor problems is also within the abilities of those skilled in the art. Further, although the present invention has been described by using a vocabulary corresponding more to a hardware implementation, its implementation may partially or totally use software means, for example, by exploiting in software fashion digitized signal IN.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for detecting a modulation factor in a signal received in amplitude modulation, comprising:
   comparing the received signal with two first values;
   comparing the received signal with two second values ranging between the two first values; and
   considering a presence of an insufficient modulation depth if the received signal ranges between at least two of said values.

2. The method of claim 1, wherein said values are adapted with respect to an average level of the received signal.

3. The method of claim 1, wherein said values are adapted to a supply voltage of the demodulator.

4. The method of claim 1, comprising the step of transmitting to the signal transmitter information about the possible presence of an insufficient modulation factor.

5. The method of claim 1, wherein the receiver is an electromagnetic transponder.

6. A method for detecting errors in a signal received in amplitude modulation, comprising:
   detecting a possible insufficiency of the modulation factor of the transmitted signal by implementing the method of claim 1; and
   detecting a possible error due to noise by sampling the demodulated signal at a frequency greater than the modulation frequency, to detect possible parasitic state switchings.

7. The method of claim 6, comprising the step of transmitting to the signal transmitter information about the possible presence of an error due to the noise to cause a decrease in the transmission passband.

8. The method of claim 6, wherein a possible frame error is detected by checking of predetermined data at each start of frame.

9. The method of claim 8, comprising the step of transmitting to the signal transmitter information about the presence of a frame error.

10. An amplitude demodulator, comprising:
    a first element for filtering a signal received in amplitude modulation to provide a signal to be interpreted;
    a second filtering element having a time constant smaller than that of the first filtering element to determine an average value of the received signal;
    two first elements for comparing the amplitude of the signal to be interpreted with respect to two values surrounding said average value;
    at least two second elements for comparing the amplitude of the signal to be interpreted with respect to two second values surrounding the average value and ranging between the first two values; and
    a circuit for interpreting the results of the comparison elements indicating an insufficient modulation factor if the received signal ranges between at least two of said values.

11. An amplitude demodulator comprising:
    an element for filtering a signal received in amplitude modulation;
    a capacitive element for filtering a first D.C. component provided by the filtering element;
    an element for adding a second D.C. component corresponding to half the supply voltage of the demodulator to the signal resulting from the capacitive element;
    two first elements for comparing the amplitude of the signal to be interpreted with respect to two values surrounding half of said supply voltage;
    and comprising:
    at least two second elements for comparing the amplitude of the signal to be interpreted with respect to two second values surrounding half of said supply voltage and ranging between the two first values; and
    a circuit for interpreting the results of the comparison elements indicating an insufficient modulation factor if the received signal ranges between at least two of said values.

12. The demodulator of claim 10, wherein the outputs of the comparison elements are read by flip-flops.

13. The demodulator of claim 11, wherein the outputs of the comparison elements are read by flip-flops.

14. The demodulator of claim 10, wherein the circuit for interpreting the received signal checks for the presence of a predetermined message at each start of a transmitted frame.

15. The demodulator of claim 11, wherein the circuit for interpreting the received signal checks for the presence of a predetermined message at each start of a transmitted frame.

16. The demodulator of claim 10, wherein the circuit for interpreting the received signal checks for the presence of fast state switchings as compared with the time constant of the first filtering element to determine a possible presence of noise.

* * * * *